(12) United States Patent
Miyamoto

(10) Patent No.: US 9,977,394 B2
(45) Date of Patent: May 22, 2018

(54) POWER SOURCE DEVICE, IMAGE FORMING APPARATUS AND VOLTAGE CONTROL METHOD

(71) Applicant: CANON KABUSHIKI KAISHA, Tokyo (JP)

(72) Inventor: Akitomo Miyamoto, Toride (JP)

(73) Assignee: CANON KABUSHIKI KAISHA, Tokyo (JP)

(\*) Notice: Subject to any disclaimer, the term of this patent is extended or adjusted under 35 U.S.C. 154(b) by 88 days.

(21) Appl. No.: 14/584,389

(22) Filed: Dec. 29, 2014

(65) Prior Publication Data

US 2015/0194899 A1    Jul. 9, 2015

(30) Foreign Application Priority Data

Jan. 6, 2014 (JP) .................... 2014-000225
Dec. 19, 2014 (JP) .................... 2014-257540

(51) Int. Cl.

| H02M 7/5387 | (2007.01) |
| H02M 1/00 | (2006.01) |
| G03G 15/06 | (2006.01) |
| G03G 15/00 | (2006.01) |
| H02M 7/5395 | (2006.01) |

(52) U.S. Cl.
CPC ......... *G03G 15/80* (2013.01); *G03G 15/5004* (2013.01); *H02M 7/5395* (2013.01); *H02M 7/53873* (2013.01); *G03G 15/06* (2013.01); *H02M 2001/0022* (2013.01)

(58) Field of Classification Search
CPC ............ H02M 7/53873; H02M 7/539; H02M 7/5395; H02M 2007/53878; G03G 15/5004; G03G 15/80; G03G 15/06
USPC ............................................... 363/17; 399/88
See application file for complete search history.

(56) References Cited

U.S. PATENT DOCUMENTS

| 5,164,771 A * | 11/1992 | Suzuki ............... G03G 15/0266 355/69 |
| 9,285,702 B2 * | 3/2016 | Nakagawa ........... G03G 15/043 |
| 2006/0091916 A1 * | 5/2006 | Uchiyama ................. H02J 3/02 327/108 |
| 2007/0274736 A1 * | 11/2007 | Sato .................... G03G 15/5004 399/88 |

(Continued)

*Primary Examiner* — Jeffrey Gblende
*Assistant Examiner* — David A. Singh
(74) *Attorney, Agent, or Firm* — Fitzpatrick, Cella, Harper & Scinto

(57) ABSTRACT

The power source device comprises a transformer, a voltage detection unit, a CPU and a drive circuit. Through an applying of a DC voltage, the transformer generates an AC voltage for development of an amplitude corresponding to the voltage value and an applying time of the DC voltage. The voltage detection unit detects a voltage value of the DC voltage. The CPU sets a reference value and generates PWM signals for controlling the applying time in accordance with a difference between the voltage value detected in the voltage detection unit and the reference value. The reference value is a voltage value of the DC voltage when an amplitude of the AC voltage reaches a predetermined value in a predetermined applying time. Controlling the applying time of the DC voltage to the transformer in accordance with the PWM signals, the drive circuit suppress variation in amplitude of the AC voltage.

9 Claims, 9 Drawing Sheets

(56) References Cited

U.S. PATENT DOCUMENTS

| | | | |
|---|---|---|---|
| 2009/0028593 A1* | 1/2009 | Okumura | G03G 15/5004 |
| | | | 399/55 |
| 2010/0149840 A1* | 6/2010 | Hayasaki | H02M 3/3381 |
| | | | 363/21.09 |
| 2012/0027447 A1* | 2/2012 | Mukaibara | G03G 15/1645 |
| | | | 399/88 |
| 2012/0062188 A1* | 3/2012 | Tanabe | H02M 7/48 |
| | | | 323/247 |
| 2012/0070177 A1 | 3/2012 | Okumura | |
| 2012/0070178 A1* | 3/2012 | Okumura | H03K 7/08 |
| | | | 399/88 |
| 2012/0218787 A1* | 8/2012 | Fan | H02M 3/33523 |
| | | | 363/21.15 |
| 2012/0230715 A1* | 9/2012 | Ogino | G03G 15/1675 |
| | | | 399/66 |
| 2013/0164017 A1* | 6/2013 | Komai | H02M 7/06 |
| | | | 399/88 |
| 2014/0001344 A1* | 1/2014 | Lewis | H02M 7/103 |
| | | | 250/214 LA |
| 2014/0321869 A1* | 10/2014 | Fujihara | G03G 15/0907 |
| | | | 399/55 |

* cited by examiner

POWER SOURCE DEVICE, IMAGE FORMING APPARATUS AND VOLTAGE CONTROL METHOD

BACKGROUND OF THE INVENTION

Field of the Invention

The present invention relates to a power source device which supplies power to an electronic device such as an image forming apparatus including a printer, a scanner, a copier, or a multifunctional peripheral having the integrated functions of the printer, scanner, and copier.

Description of the Related Art

To form a toner image on a sheet, the image forming apparatus performs steps such as charging, exposing, developing, transferring, and fixing steps. The toner image is formed on an image carrier such as a photosensitive drum through the charging, exposing and developing steps. Through the transferring step, the toner image formed on the image carrier is transferred onto the sheet. Through the fixing step, the toner image having transferred onto the sheet is fixed on the sheet. In these steps, a high voltage is sometimes applied. The image forming apparatus generates a high voltage using a built-in power source device and supplies it to a component requiring the high voltage.

In a charger used in the charging step and a developing device used in the developing step, a high voltage formed by superposing a DC (direct current) voltage on an AC (alternating current) voltage is used. The superposing DC voltage is referred to as "superposed DC voltage" in the specification. Therefore, the power source device comprises a DC high voltage power source circuit and an AC high voltage power source circuit.

The AC high voltage power source circuit drives switching element such as a field effect transistor (FET) through, for example, a full bridge circuit to generate an AC voltage of high voltage by a transformer. A DC voltage for driving the AC high voltage power source circuit (hereinafter referred to as "driving DC voltage") is generated from a commercial AC voltage. US Publication No. 2012/0070177 discloses a power source circuit in which a driving DC voltage is directly applied to a switching element and a voltage converter such as a transformer is used to generate an AC voltage of high voltage.

It is desirable that, when the driving DC voltage is directly applied to the switching element of the AC high voltage power source circuit, the driving DC voltage does not vary. Actually, however, the driving DC voltage varies due to some reasons including a variability caused by an individual variability of AC/DC converter generating the driving DC voltage, and use environment and use condition of the AC/DC converter. Further, in the image forming apparatus, the driving DC voltage generated by the AC/DC converter is sometimes simultaneously used in a plurality of components (loads). This also a variation factor of the driving DC voltage.

The variability and the variation in the driving DC voltage affect voltage in a primary coil of the transformer in the AC high voltage power source circuit. This results in a variation in an amplitude of the AC voltage generated in the AC high voltage power source circuit. The variation in the amplitude causes a change in a charge amount of the image carrier in, for example, the charging step. The change in the charge amount of the image carrier affects a toner adhesion amount in the developing step. This causes a variation factor of a density of the toner image, thereby the images with desired density cannot be formed. One of the solution to suppress the variation in the driving DC voltage is using a regulator. This, however, results in an enlargement of a circuit scale and an increase in cost so that this is not a decisive solution.

SUMMARY OF THE INVENTION

According to an aspect of the present disclosure, a power source device comprises an AC voltage generation unit, a voltage detection unit, and a variation amount detection unit. The AC voltage generation unit is configured to generate an AC voltage through an applying of the DC voltage, the AC voltage having an amplitude in accordance with the voltage value and an applying time of the DC voltage. The voltage detection unit is configured to detect the voltage value of the DC voltage. The variation amount detection unit is configured to detect a variation amount of the voltage value, which is detected in the voltage detection unit, from a reference value, which is a voltage value of the DC voltage when the AC voltage becomes a predetermined amplitude in a predetermined applying time. The AC voltage generation unit is configured to adjust the applying time of the DC voltage in accordance with the variation amount.

Further features of the present invention will become apparent from the following description of exemplary embodiments (with reference to the attached drawings).

DESCRIPTION OF THE EMBODIMENTS

Hereinafter, an embodiment of the present invention is described in detail with reference to the accompanying drawings.

Figure 1:
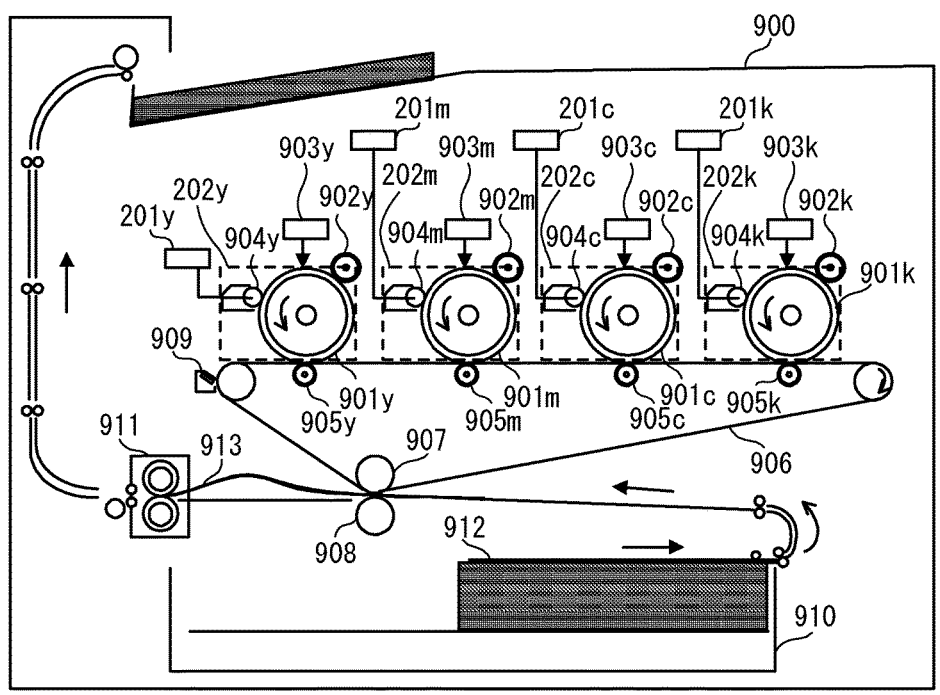
FIG. 1 is a configuration diagram of an image forming apparatus.

FIG. 1 is a configuration diagram of an image forming apparatus according to this embodiment.

An image forming apparatus 900 comprises four image forming units, 202y, 202m, 202c, and 202k, which are linearly arranged. The image forming unit 202y forms a yellow toner image. The image forming unit 202m forms a magenta toner image. The image forming unit 202c forms a cyan toner image. The image forming unit 202k forms a black toner image. Now, a configuration of the image forming unit 202y is described. The image forming units 202m, 202c, and 202k are different from the image forming unit 202y in terms of the toner color used to form toner image. Their configurations and the operations, however, are the same as those of the image forming unit 202y. Therefore, the detailed description with regard to the image forming units 202m, 202c, and 202k is omitted.

The image forming unit 202y comprises a photosensitive drum 901y, which is an image carrier and rotates in a counterclockwise direction in the drawing. A primary charging roller 902y, which acts as a charger, uniformly charges a surface of the photosensitive drum 901y. A laser unit 903y irradiates the uniformly charged surface of the photosensitive drum 901y with a laser light to form latent images. The latent images formed on the photosensitive drum 901y are developed by a yellow toner supplied from a developing device 904y to be turned into a toner image. The toner images developed on the photosensitive drum 901y are transferred onto an intermediate transfer belt 906 by a primary transfer roller 905y.

The toner images of each color formed by the image forming units 202y, 202m, 202c, and 202k are transferred onto the intermediate transfer belt 906 such that the toner images are superimposed on the intermediate transfer belt 906. Then, full-color toner images are formed on the intermediate transfer belt 906. The toner images formed on the intermediate transfer belt 906 are transferred onto a sheet 912 by a secondary transfer roller 907 and a secondary transfer outer roller 908. A cleaner 909 recovers residual toner remaining on the intermediate transfer belt 906 after the toner images are transferred onto the sheet 912.

The sheet 912, stored in a sheet cassette 910, is conveyed to the secondary transfer roller 907 and the secondary transfer outer roller 908 in accordance with a timing of image formation of the image forming units 202y, 202m, 202c, and 202k.

The sheet 912 having the toner images transferred thereon is conveyed to a fixing device 911. For example, the fixing device 911 heats and pressurizes the sheet 912 to fix the toner images on the sheet 912. The sheet 912 having the toner images fixed thereto 19 is delivered outside the image forming apparatus 900. Through the above mentioned manner, image is formed on the sheet 912.

Figure 2:
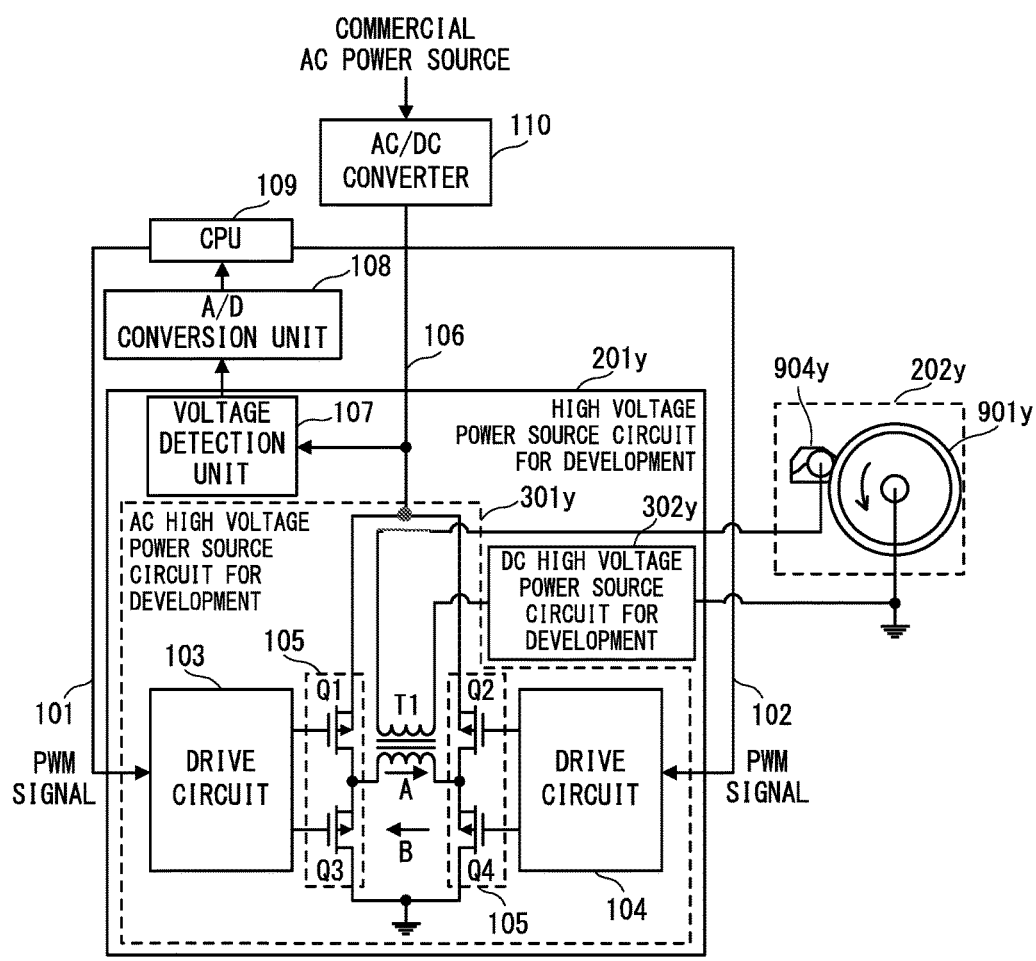
FIG. 2 is a configuration diagram of high voltage power source circuit for development.

The image forming apparatus 900 has a built-in high voltage power source circuit which supplies the AC voltage to each image forming unit 202y, 202m, 202c, and 202k. FIG. 2 is a configuration diagram of a high voltage power source circuit for development 201y, which is one of the examples of such high voltage power source circuit which supplies an AC voltage of high voltage to the developing device 904y.

The high voltage power source circuit for development 201y is connected to an AC/DC converter 110, which generates a driving DC voltage 106 from a commercial AC power source supplied from outside. The high voltage power source circuit for development 201y generates an AC voltage from the driving DC voltage 106 and supplies it to the developing device 904y. The high voltage power source circuit for development 201y controls voltage value of AC voltage and the like supplied to the developing device 904y. This is achieved by using pulse width modulation (PWM) signals 101 and 102 as a control signal. The PWM signal is a signal sent from a CPU 109, which performs operation control of the entire image forming apparatus. The AC voltage, which is a rectangular wave in this embodiment, is applied to a developing sleeve of the developing device 904y. Through the applying of the AC voltage from the high voltage power source circuit for development 201y, the developing device 904y develops the latent images formed on the surface of the photosensitive drum 901y.

The high voltage power source circuit for development 201y comprises an AC high voltage for development power source circuit 301y, a DC high voltage power source circuit 302y for development, and a voltage detection unit 107.

The AC high voltage for development power source circuit 301y generates an AC voltage of high voltage (hereinafter referred to as "AC high voltage for development") which is applied to the developing device 904y. The AC high voltage for development power source circuit 301y generates the AC high voltage for development. This is an internal AC voltage used in the image forming apparatus 900. The AC high voltage for development power source circuit 301y is an internal AC voltage generation circuit. The AC high voltage power source circuit for development 301y comprises drive circuits 103 and 104, a full bridge circuit 105 comprising of switching elements (Q1 to Q4), and a transformer T1.

The developing DC high voltage power source circuit 302y is a DC voltage generation unit which generates a high-voltage superposed DC voltage superposed on the AC high voltage for development. The voltage detection unit 107 detects a voltage value of the driving DC voltage 106 applied to the AC high voltage power source circuit for development 301y. The voltage detection unit 107 comprises a voltage dividing circuit which reduces the detected driving DC voltage 106.

The A/D conversion unit 108 converts the driving DC voltage 106, reduced in the voltage detection unit 107, to a digital signal. The CPU 109 generates the PWM signals 101 and 102 whose duty ratios are adjusted in accordance with the digital signal sent from the A/D conversion unit 108.

The PWM signals 101 and 102 operate the drive circuits 103 and 104 to control a state of the full bridge circuit 105. Controlled by the drive circuits 103 and 104, when the PWM signals 101 and 102 are high state and low state respectively, the switching elements Q1 and Q4 of the full bridge circuit 105 are turned ON and the switching elements Q2 and Q3 of the full bridge circuit 105 are turned OFF. At this time, a current flows in a primary coil of the transformer T1 in a first direction A in accordance with the driving DC voltage 106 applied on one end.

Conversely, when the PWM signal 101 is low state and PWM signal 102 is high state and high state, the switching elements Q2 and Q3 of the full bridge circuit 105 are turned ON and the switching elements Q1 and Q4 of the full bridge circuit 105 are turned OFF. At this time, a current flows in a primary coil of the transformer T1 in a second direction B in accordance with the driving DC voltage 106 applied on the other end.

The PWM signal 101 is a signal which repeats to turn a high state and a low state a predetermined number of times and thereafter, keeps the low state for a predetermined time, which is repeated during the output of the PWM signal 101. In other words, the PWM signal 101 is a signal including a plurality of pulses which is output in a period of the primary coil driving signal (PWM signal). The period corresponds to a period during which a voltage is output to a secondary coil of the transformer T1. A period during which the PWM signal 101 repeats transition from high state to low state is referred to as a pulse period. A period during which the PWM signal 101 keeps the low state for a predetermined time is referred to as a blank period. The same holds true with regard to the PWM signal 102. In a case where the PWM signals 101 and 102 are in the pulse period and in the blank period respectively, a current periodically flows in the primary coil of the transformer T1 in the first direction A. The superposed DC voltage is applied to the secondary coil of the transformer T1 from the DC high voltage power source circuit for development 302y. Therefore, an electromotive force of the current flowing to the first direction A causes to vary the superposed DC voltage in a positive direction.

In a case where the PWM signals 101 and 102 are in the blank period and in the pulse period respectively, a current periodically flows in the primary coil of the transformer T1 in the second direction B. An electromotive force of the current flowing to the second direction B causes to vary the superposed DC voltage in a negative direction.

When the above procedures are repeated, an AC high voltage for development of a rectangular waveform is generated, in which the superposed DC high voltage is superposed on the secondary coil of the transfer T1. As above, the transformer T1 is driven by the PWM signals 101 and 102 and the driving DC voltage 106. The driving DC voltage 106 is then alternatively applied to the transformer T1 from both ends of the primary coil to generate the AC voltage in the secondary coil. Note that since the number of turns of the secondary coil of the transformer T1 is high, the transformer T1 operates as a step-up transformer. The voltage applied to the primary coil is boosted at the secondary coil to a high voltage.

Figure 3:
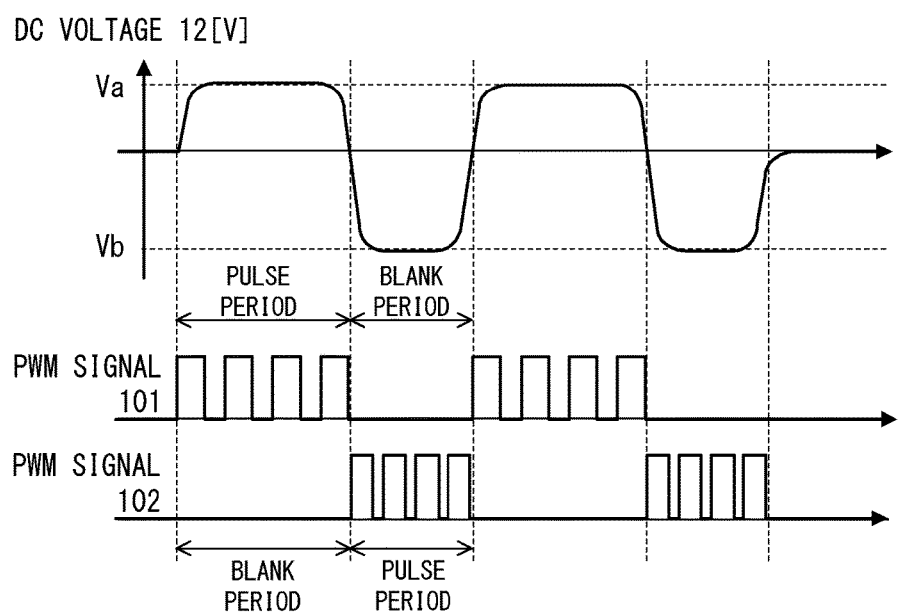
FIG. 3 is an explanatory diagram for explaining PWM signals and waveform of AC high voltage for development.

FIG. 3 is an explanatory diagram for explaining the PWM signals 101 and 102 and a waveform of an AC high voltage for development output from the AC high voltage power source circuit for development 301y. As mentioned, the driving DC voltage 106 (12 [V]) is applied to the primary coil of the transformer T1 and the superposed DC voltage is applied to the secondary coil. Then, the current flowing to the primary coil of the transformer T1 is controlled by the PWM signals 101 and 102.

Each pulse width (on-width) in each pulse period of the PWM signals 101 and 102 relates to an output voltage of the transformer T1. The wider on-width elongates the total applying time of the driving DC voltage 106 to the transformer T1 in a single pulse period. In proportion to the length of the total applying time, the amplitude of the AC high voltage for development generated is enlarged. In each pulse period of the PWM signals 101 and 102, pulse signal of the same period is repeated. The on-width (pulse width) to the period represents a duty ratio of each pulse signal. The duty ratios of the pulse signal in the pulse period of the PWM signals 101 and 102 turn 100 [%] when the on-width is maximum and turn 0 [%] when the on-width is minimum.

A reference voltage value (hereinafter referred to as "reference value") of the driving DC voltage 106 is set as 12[V]. An initial duty ratio is a duty ratio of the pulse signals of the PWM signals 101 and 102 in which the secondary coil output of the transformer T1 turns to be a rectangular waveform with desired amplitude. The waveform of the AC high voltage for development is represented by a maximum value Va, a minimum value Vb and an amplitude, which is obtained by (Va–Vb). The maximum value Va is generated when the current flows to the transformer T1 in the first direction A. The minimum value Vb is generated when the current flows to the transformer T1 in the second direction B.

Figure 4A:
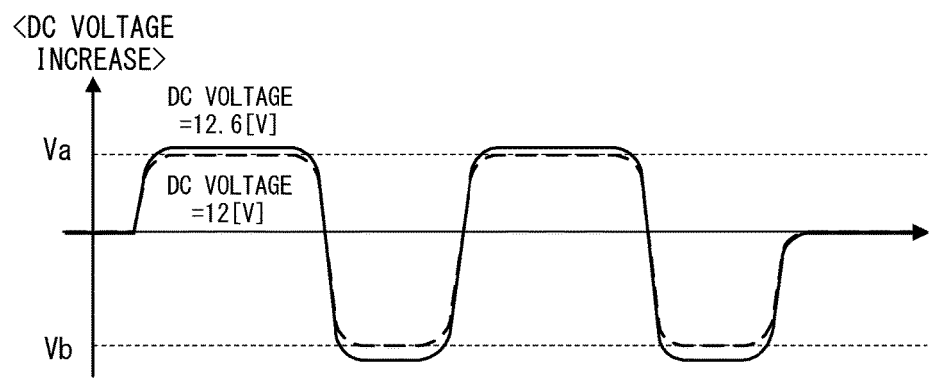
FIG. 4A is a diagram illustrating waveform of AC high voltage for development when DC voltage is increased.
Figure 4B:
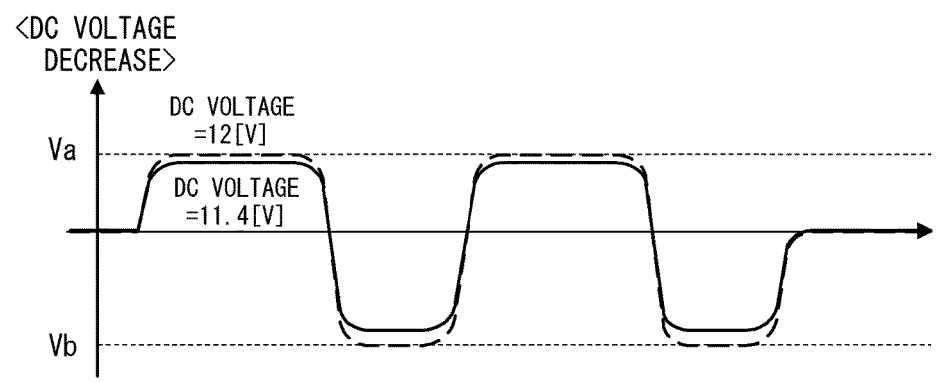
FIG. 4B is a diagram illustrating waveform of AC high voltage for development when DC voltage is reduced.

FIG. 4A is a diagram illustrating a waveform of the AC high voltage for development when the DC voltage 106 is increased to 12.6 [V]. FIG. 4B is a diagram illustrating a waveform of the AC high voltage for development when the DC voltage 106 is reduced to 11.4 [V]. A broken line in each drawing represents a waveform of the AC high voltage for development when the driving DC voltage is the reference value. A solid line in each drawing represents a waveform of the AC high voltage for development when the driving DC voltage 106 is varied.

FIG. 4A represents an AC high voltage for development when the driving DC voltage 106 is increased by 5% compared with the reference value. Along with this, the amplitude of the AC high voltage is increased by 5%. FIG. 4B represents an AC high voltage for development when the driving DC voltage 106 is reduced by 5% compared with the reference value. Along with this, the amplitude of the AC high voltage is reduced by 5%. This is because the voltage generated in the secondary coil represents a product of the coil turns ratio and the voltage applied to the primary coil. Thus, in proportion to the variation in the driving DC voltage 106 applied to the primary coil, the amplitude of the AC high voltage for development generated in the secondary coil varies.

In this embodiment, for such variation in the driving DC voltage 106, the CPU 109 detects the variation to suppress the variation in the amplitude of the AC high voltage for development by the PWM signals 101 and 102. The CPU 109 detects a variation amount based on the reference value of the driving DC voltage 106 detected in the voltage detection unit 107. Then, the CPU 109 corrects the duty ratio of the PWM signals 101 and 102 such that the correction amount corresponds to the detected variation amount. The corrected duty ratio is then input to the AC high voltage power source circuit for development 201y.

Figure 5:
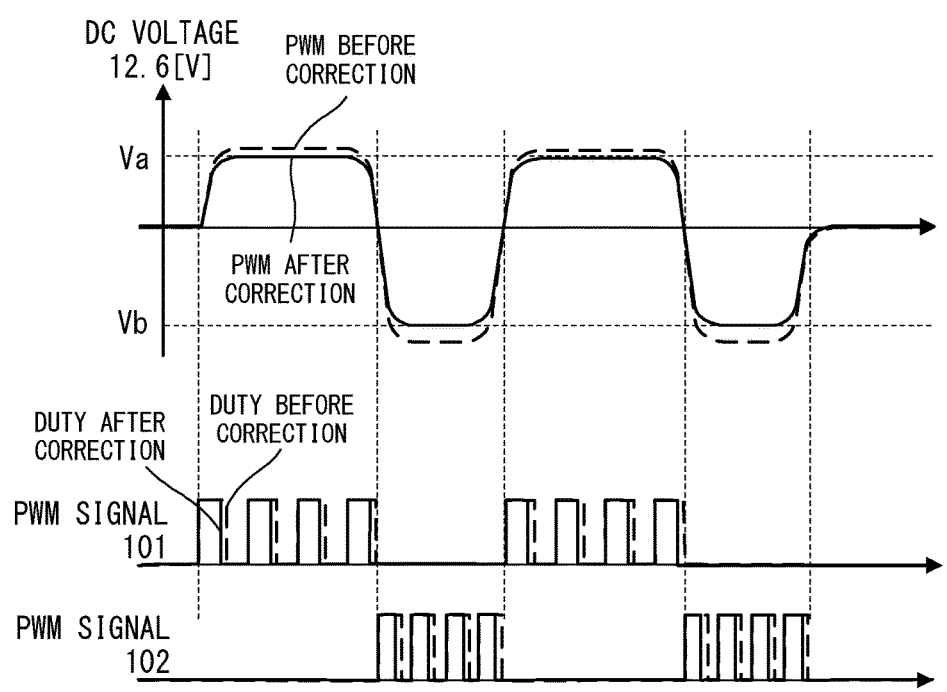
FIG. 5 is a diagram illustrating waveform of AC high voltage for development before and after correction of PWM signals.

FIG. 5 is a diagram illustrating a waveform of the AC high voltage for development before and after the correction of the PWM signals 101 and 102. The CPU 109 changes the duty ratio of the pulse in the pulse period of the PWM signals 101 and 102, thereby the total applying time to the transformer 1 is changed, and corrects the amplitude of the AC high voltage for development. In FIG. 5, the driving DC voltage 106 is 12.6 [V], increased by 5% compared with the reference value.

As described in FIG. 4A, in this case, the amplitude of the AC high voltage for development is increased by 5% so that a voltage higher than the reference value is applied to the developing device 904y. In this case, dark toner image is formed. Therefore, the amplitude of the AC high voltage for development needs to be reduced.

The CPU 109 calculates a ratio of the driving DC voltage 106 detected in the voltage detection unit 107 to the reference value. Here, the detected driving DC voltage 106 is 12.6[V] and the reference value is 12 [V]. The ratio is multiplied to the duty ratio of each pulse signal of the PWMs signal 101 and 102. As mentioned, the amplitude of the AC high voltage for development generated in the secondary coil of the transformer T1 represents the product of the driving DC voltage 106 applied to the primary coil and the coil turns ratio. Therefore, the ratio of the reference value of the driving DC voltage 106 to the voltage value of the driving DC voltage 106 detected in the voltage detection unit 107 is equal to that of the amplitude of the respectively corresponding AC high voltage for development. Therefore, in this embodiment, 1) the ratio of the reference value of the driving DC voltage 106 to the detected voltage value (i.e., 12/12.6) is multiplied to 2) the duty ratio of the PWM signals 101 and 102 before correction. This is equal to multiply 3) the ratio of the amplitudes before and after the variation in the driving DC voltage 106 of the AC high voltage for development to 4) the duty ratio.

For example, following shows an expression in a case where the initial duty ratio is 50[%].

$$(12[V]/12.6[V])*50[\%] ≈ 47.62$$

The PWM signals 101 and 102 thus obtained have a feature in that the duty ratio after the correction shown by the solid line is reduced as compared to that before the correction shown by the broken line. The amount of reduction corresponds to the variation rate of the amplitude of the AC high voltage for development. Due to this, the total applying time to the transformer T1 is reduced and the AC high voltage for development generated can be maintained in a desired amplitude. Similarly, in a case where the driving DC voltage 106 is reduced, through the correction of the duty ratio of the PWM signals 101 and 102 in accordance with the ratio of the reference value of the driving DC voltage 106 and the detected value, the AC high voltage for development can be maintained in a desired amplitude.

As mentioned, correcting, by the CPU 109, the duty ratio of the PWM signals 101 and 102 in accordance with the variation amount of the driving DC voltage 106, the variation in amplitude of the AC high voltage for development can be suppressed. Description has been given with regard to the high voltage power source circuit for development 201y which supplies the AC high voltage for development to the developing device 904y for yellow colors. Similarly, the amplitude variation in the AC high voltage for development can be suppressed through the use of the high voltage power source circuits for development 201m, 201c, and 201k, which supply the AC high voltage for development to each developing device 904m, 904c, and 904k for magenta, cyan, and black colors respectively.

The image forming apparatus 900 as mentioned above is applicable to the following first to third embodiments. By applying the image forming apparatus 900 to the following first to third embodiments, voltage is controlled so as to suppress the amplitude variation in the developing AC voltage.

[First Embodiment]

Figure 6:
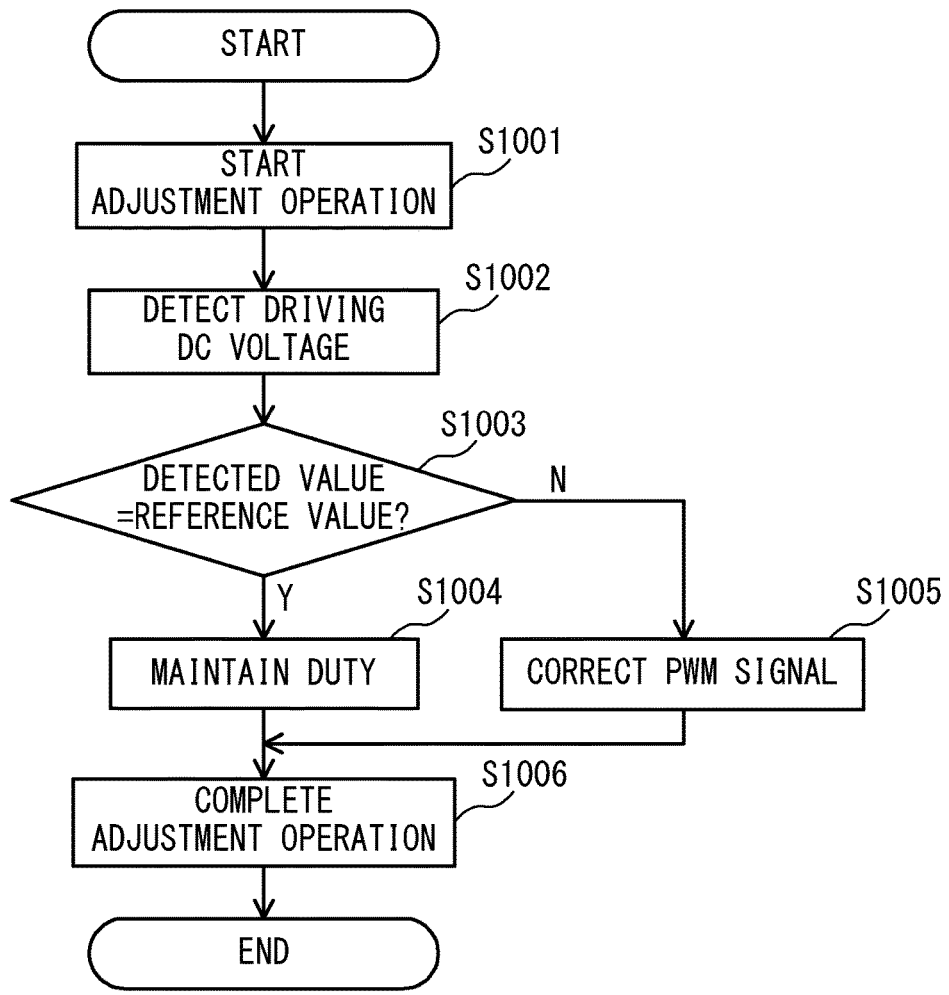
FIG. 6 is a flowchart illustrating processing for suppressing amplitude variation of AC high voltage for development of a first embodiment.

FIG. 6 is a flowchart illustrating processing for suppressing the amplitude variation in the AC high voltage for development of a first embodiment. In the first embodiment, at a startup of the image forming apparatus 900, the driving DC voltage 106 is detected and the PWM signals 101 and 102 are corrected.

When a power is turned on, the image forming apparatus 900 starts a warm-up operation. First, the CPU 109 starts adjustment operation of each unit of the image forming apparatus 900 (S1001). Then, the CPU 109 obtains the voltage value of the driving DC voltage 106 (hereinafter referred to as "detected value") detected in the voltage detection unit 107 (S1002). The CPU 109 compares the detected value with the reference value of the driving DC voltage 106 to determine whether the detected value is equal to the reference value (S1003) or not.

If it is determined that the detected value is equal to the reference value, the CPU 109 maintains an initial duty ratio of the pulse signal in the pulse period of the PWM signals 101 and 102 (S1003: Y, S1004). The value of the initial ratio is predetermined. For example, it is set as 50%. If it is determined that the detected value is not equal to the reference value, the CPU 109 corrects the duty ratio of the pulse signals in the pulse period of the PWM signals 101 and 102 as mentioned in accordance with the variation amount of the detected value from the reference value (S1003: N, S1005). Thereafter, the CPU 109 completes the adjustment operation of each unit of the image forming apparatus (S1006). As above, the warm-up operation ends.

After the end of the warm-up operation, the image forming apparatus 900 turns a standby state of a job, in which when any job occurs, the image formation processing in accordance with the job is performed. At the time of the image formation, the CPU 109 inputs the PWM signals 101 and 102 to which the duty ratio have been set in the Steps S1004 and S1005 to the AC high voltage power source circuit for development 301y. The duty ratios of the PWM signals 101 and 102 are maintained until the image forming apparatus 900 is powered off.

As mentioned, the image forming apparatus 900 corrects the PWM signals 101 and 102 at the startup of the same. Therefore, the image forming apparatus 900 can suppress the difference between the amplitudes of the AC high voltage for development to adjust the magnitude of the amplitudes to the variability of the driving DC voltage 106 caused by an individual variability of AC/DC converter 110.

[Second Embodiment]

Figure 7:
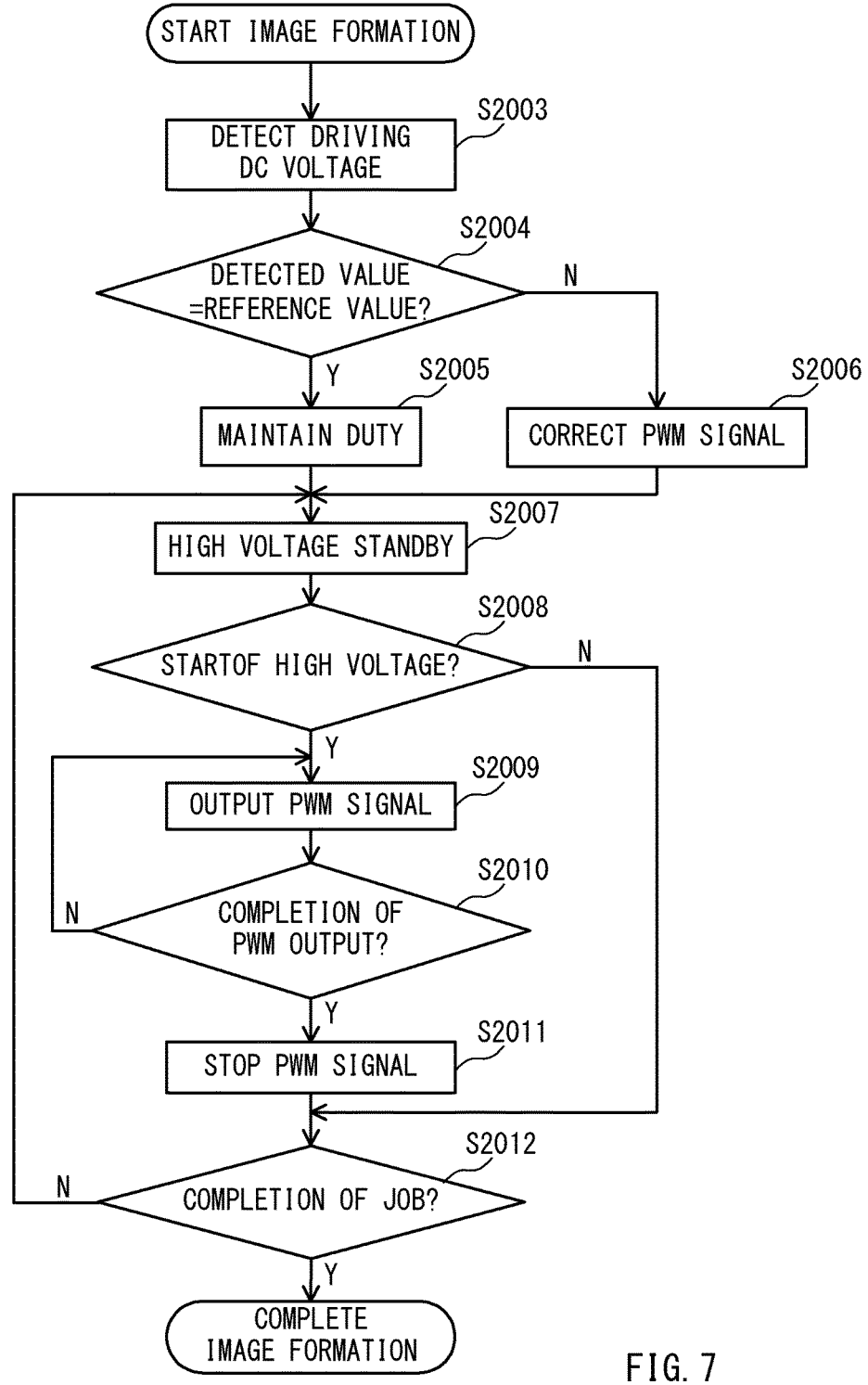
FIG. 7 is a flowchart illustrating processing for suppressing amplitude variation of AC high voltage for development of a second embodiment.

FIG. 7 is a flowchart illustrating processing for suppressing amplitude variation in the AC high voltage for development of a second embodiment. In the second embodiment, the detection of the driving DC voltage 106 and the correction of the PWM signals 101 and 102 are performed after the startup of the image forming apparatus 900 and during the image forming processing.

In particular, the timing is when the warm-up operation of the image forming apparatus 900 ends. After the end of the warm-up operation, the image forming apparatus 900 is in standby state of a job.

When a job for image formation occurs while the image forming apparatus 900 is in standby state, the CPU 109 starts an image forming processing. In the image forming processing, when formation of the latent images on the photosensitive drums 901y, 901m, 901c, and 901k is completed, developing step is performed.

In the developing step, the CPU 109 first obtains the detection value of the driving DC voltage 106 detected in the voltage detection unit 107 (S2003). The CPU 109 compares the detected value with the reference value of the driving DC voltage 106 to determine whether the detected value is equal to the reference value (S2004) or not. If it is determined that the detected value is equal to the reference value, the CPU 109 maintains the initial duty ratio of the PWM signals 101 and 102 (S2004: Y, S2005). If it is determined that the detected value is not equal to the reference value, the CPU 109 corrects the duty ratio of the pulse signal in the pulse period of the PWM signals 101 and 102 as mentioned in accordance with the variation amount of the detected value from the reference value (S2004: N, S2006).

When the duty ratio of the pulse signal in the pulse period of the PWM signals 101 and 102 is determined, the CPU 109 enters a high voltage standby mode to wait for a timing to start high voltage applying (S2007). The CPU 109 determines the start of high voltage applying based on a conveyance position of the sheet 912 in the image forming apparatus 900 or state of other image forming operation. When the CPU 109 decides not to start the high voltage applying, the CPU 109 determines completion of the job (S2008: N, S2012).

When the CPU 109 decides to start the high voltage applying, the CPU 109 starts to output the PWM signals 101 and 102 (S2008: Y, S2009). By the output of PWM signals 101 and 102, the AC high voltage for development, the amplitude variation of which has been suppressed, is supplied to the developing devices 904y, 904m, 904c, and 904k.

The CPU 109 outputs the PWM signals 101 and 102 until it is determined to stop output of the PWM signals 101 and 102 (S2010: Y, S2011). For example, the CPU 109 stops outputting of the PWM signals 101 and 102 when the developing step is completed.

Thereafter, the CPU 109 determines whether the job is completed or not. If it is determined that the job is completed, the CPU 109 completes the image forming processing (S2012: Y). If it is determined that the job is not completed, the CPU 109 returns the high voltage standby state (S2012: N, S2007).

As mentioned, by correcting the PWM signals 101 and 102 before the applying of the high voltage, the image forming apparatus 900 can suppress difference between the amplitudes of the AC high voltage for development to adjust the magnitude of the amplitudes to the variation in the driving DC voltage 106 caused while the apparatus is in a continuous operation or caused by a change in a use environment such as an ambient temperature.

[Third Embodiment]

Figure 8A:
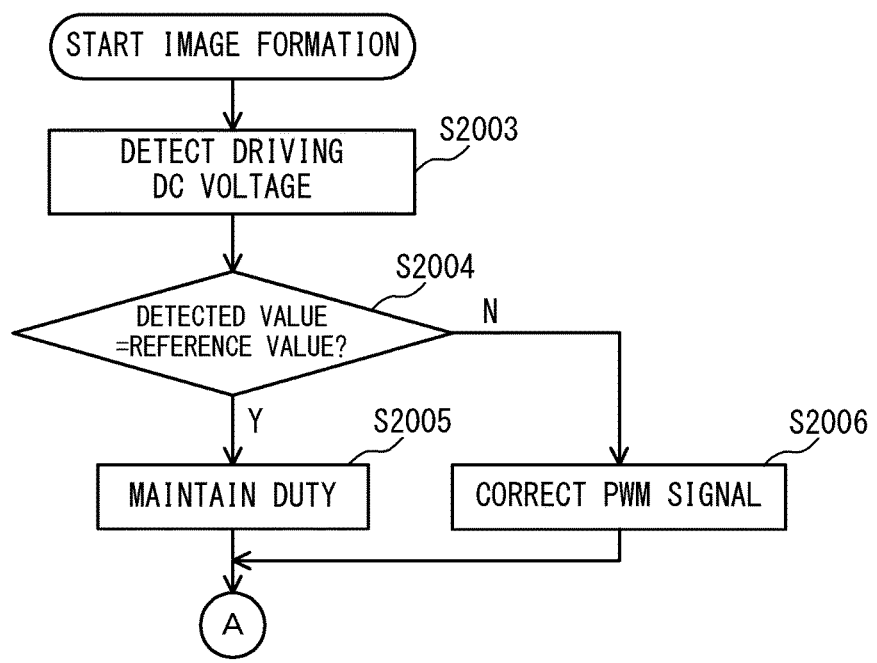
FIG. 8A is a flowchart illustrating processing for suppressing amplitude variation of AC high voltage for development of a third embodiment.

FIG. 8A is a flowchart illustrating processing for suppressing the amplitude variation in the AC high voltage for development of a third embodiment. In the third embodiment, the detection of the driving DC voltage 106 and the correction of the PWM signals 101 and 102 are performed in a fixed time interval while the high voltage is applied during the image forming processing.

Figure 8B:
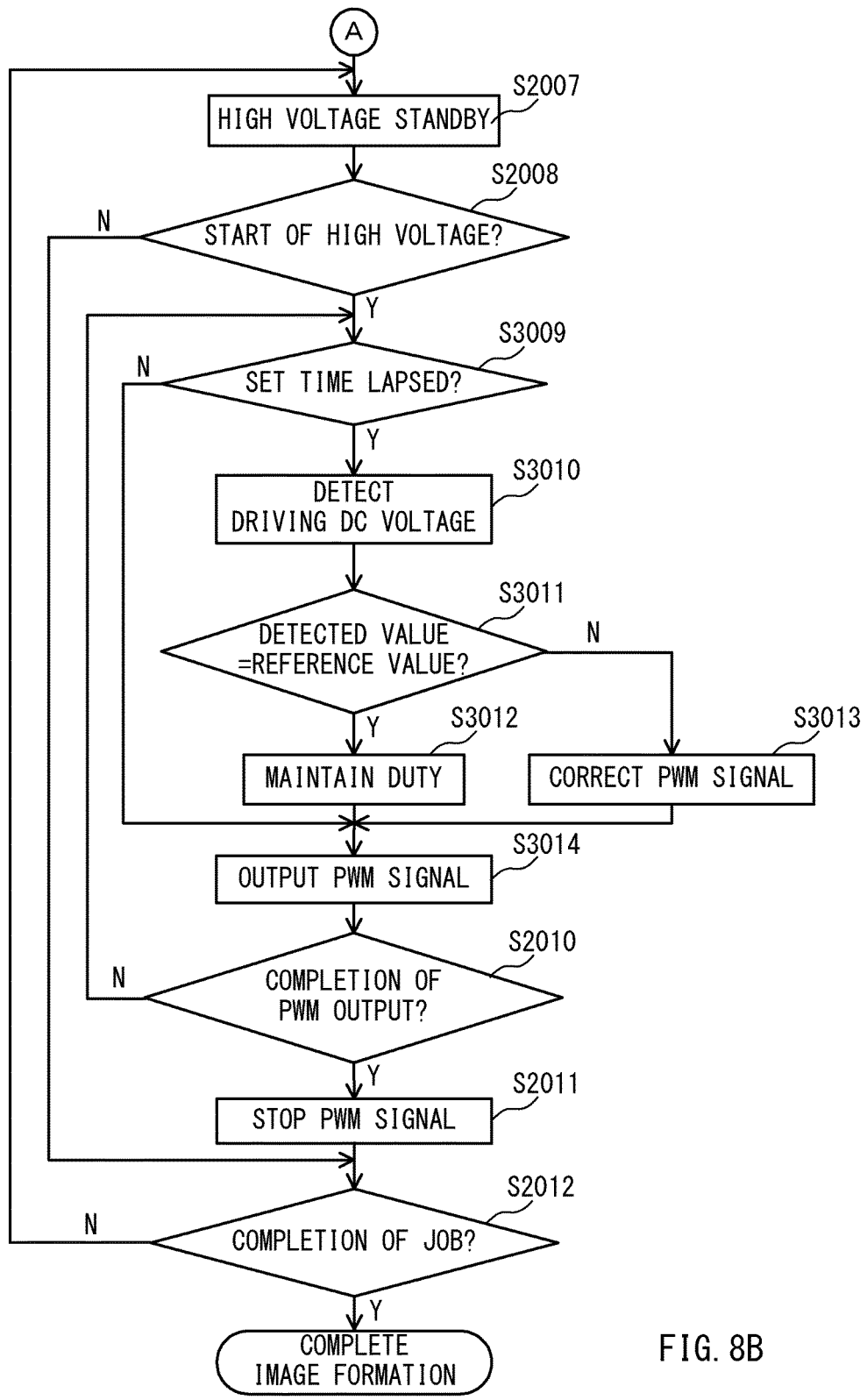
FIG. 8B is a flowchart illustrating processing for suppressing amplitude variation of AC high voltage for development of a third embodiment.

In particular, the detection of the driving DC voltage 106 and the correction of the PWM signals 101 and 102 are performed by the image forming apparatus 900 after the transition to a high voltage standby mode (S2007) and determination of the start of the high voltage applying is done (S2008) in the second embodiment. The processing from the detection of the driving DC voltage to the determination of the start of the high voltage applying (S2003 to S2008: FIGS. 8A, 8B) are the same as the processing in second embodiment. Therefore, the description thereof is omitted. If the start of the high voltage applying is determined, the CPU 109 determines whether a set time, set as a time interval for correcting the PWM signals 101 and 102, is lapsed. If it is determined that the set time is not lapsed, the CPU 109 outputs the PWM signals 101 and 102 (S3009: N, S3014). If it is determined that the set time is lapsed, the CPU 109 obtains the detection value of the driving DC voltage 106 detected in the voltage detection unit 107 (S3009: Y, S3010). The CPU 109 compares the detected value with the reference value of the driving DC voltage and determines whether the detected value is equal to the reference value (S3011).

If it is determined that the detected value is equal to the reference value, the CPU 109 maintains the initial duty ratio of the pulse signal in the pulse period of the PWM signals 101 and 102. If it is determined that the detected value is not equal to the reference value, the CPU 109 corrects the duty ratio of the pulse signal in the pulse period of the PWM signals 101 and 102 as mentioned in accordance with the variation amount of the detected value from the reference value (S3011: N, S3013). Thereafter, the CPU 109 outputs the PWM signals 101 and 102 (S3014). The processing after the output of the PWM signals (S2010 to S2012: FIG. 8B) are the same as the processing after the Step S2010 in the second embodiment. Therefore, the description thereof is omitted.

As mentioned, even the high voltage is being applied, in response to the variation in the driving DC voltage 106 in real time, the image forming apparatus 900 can suppress the difference between the amplitudes of the AC high voltage for development to adjust the magnitude of the amplitudes.

As above, the image forming apparatus 900 performs processing to cope with the variation in the driving DC voltage 106. The processing is performed, in the first embodiment, immediately after the startup of the image forming apparatus 900; in the second embodiment, during the image forming processing; and in the third embodiment, at a predetermined time interval. The above timings are not exclusive so that the processing may be performed at any timing. Also, the processing may be performed at any two timings.

According to the present invention, applying time of the DC voltage is adjusted in accordance with the difference between the voltage value of the DC voltage for generating the AC voltage and its reference value. This corrects the amplitude of the AC voltage. Therefore, even when the voltage value of the DC voltage varies, an influence to the DC voltage can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-000225, filed Jan. 6, 2014 and 2014-257540 filed Dec. 19, 2014 which are hereby incorporated by reference wherein in their entirety.

What is claimed is:

1. A power source device comprising:
    a converter configured to generate a DC voltage as a driving DC voltage based on an output of a commercial AC power source;
    an AC high voltage generator configured to generate an AC high voltage, the AC high voltage generator having a bridge circuit to which the driving DC voltage is applied, the bridge circuit being driven by a PWM signal, and an amplitude of the AC high voltage being varied in accordance with a voltage value of the driving DC voltage and an applying time of the driving DC voltage;
    a voltage detector configured to detect the voltage value of the driving DC voltage output from the converter; and
    a controller configured to determine a duty ratio of the PWM signal to change, based on a difference between the voltage value of the driving DC voltage detected by the voltage detector and a reference value, corresponding to the applying time of the driving DC voltage;
    wherein the reference value is a voltage value of the driving DC voltage at which the amplitude of the AC high voltage is a predetermined value when the AC high voltage generator is driven by the PWM signal having a predetermined duty ratio.

2. The power source device according to claim 1,
    wherein the AC high voltage generator comprises a transformer connected to the bridge circuit, and wherein the transformer generates the AC high voltage in a secondary coil of the transformer by applying the driving DC voltage to a primary coil of the transformer according to the PWM signal.

3. The power source device according to claim 2,
    wherein the controller generates the PWM signal, and determines the duty ratio of the PWM signal to change the applying time of the driving DC voltage to the primary coil.

4. The power source device according to claim 2, further comprising a DC high voltage generation unit, which applies a DC high voltage for superposing on the AC high voltage, at one end of the secondary coil of the transformer.

5. An image forming apparatus comprising:
- a converter configured to generate a DC voltage as a driving DC voltage based on an output of a commercial AC power source;
- an AC high voltage generator configured to generate an AC high voltage, the AC high voltage generator having a bridge circuit to which the driving DC voltage is applied, and which is driven by a PWM signal, an amplitude of the AC high voltage being varied in accordance with a voltage value of the driving DC voltage;
- an image forming unit to which the AC high voltage generated by the AC high voltage generator is provided, configured to perform an image forming processing;
- a voltage detector configured to detect the voltage value of the driving DC voltage output from the converter; and
- a controller configured to determine a duty ratio of the PWM signal to change an applying time of the driving DC voltage based on a difference between the voltage value of the driving DC voltage detected by the voltage detector and a reference value,
- wherein the reference value is a voltage value of the driving DC voltage at which the amplitude of the AC high voltage is a predetermined value when the AC high voltage generator is driven by the PWM signal having a predetermined duty ratio.

6. The image forming apparatus according to claim 5, wherein the AC high voltage generator comprises a transformer connected to the bridge circuit, and wherein the transformer generates the AC high voltage in a secondary coil of the transformer by applying the driving DC voltage to a primary coil of the transformer according to the PWM signal.

7. The image forming apparatus according to claim 6, further comprising a DC high voltage generation unit, which applies a DC high voltage for superposing on the AC high voltage, at one end of the secondary coil of the transformer.

8. The image forming apparatus according to claim 5, wherein the controller generates the PWM signal, and determines the duty ratio of the PWM signal to change the applying time of the driving DC voltage to the primary coil.

9. The image forming apparatus according to claim 5, wherein the image forming unit comprises an image carrier on which an electrostatic latent image is formed and a developing unit configured to develop the latent image formed on the image carrier by toner, and wherein the AC high voltage generator is configured to generate the AC high voltage which is supplied to the developing unit.

* * * * *